(12) United States Patent
Yoshikawa

(10) Patent No.: US 8,695,568 B2
(45) Date of Patent: Apr. 15, 2014

(54) INTER-CYLINDER AIR-FUEL RATIO IMBALANCE ABNORMALITY DETERMINATION DEVICE

(75) Inventor: Yuya Yoshikawa, Chiryu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 224 days.

(21) Appl. No.: 13/397,279

(22) Filed: Feb. 15, 2012

(65) Prior Publication Data

US 2012/0209497 A1     Aug. 16, 2012

(30) Foreign Application Priority Data

Feb. 16, 2011    (JP) ................................. 2011-031047

(51) Int. Cl.
     *F02M 7/00*          (2006.01)
     *F02D 41/00*        (2006.01)

(52) U.S. Cl.
     USPC ........... 123/436; 123/673; 123/690; 701/103; 701/109; 701/111

(58) Field of Classification Search
     USPC ................. 123/436, 673, 674, 679, 687, 690; 701/102, 103, 106, 107, 109, 111, 114
     See application file for complete search history.

(56) References Cited

U.S. PATENT DOCUMENTS

| | | | |
|---|---|---|---|
| 5,265,575 A * | 11/1993 | Norota | 123/436 |
| 5,579,637 A | 12/1996 | Yamashita et al. | |
| 7,877,192 B2 * | 1/2011 | Shikama et al. | 701/111 |
| 8,548,718 B2 * | 10/2013 | Kato et al. | 701/107 |
| 8,554,450 B2 * | 10/2013 | Takada et al. | 701/109 |
| 2010/0168986 A1 * | 7/2010 | Iwazaki et al. | 701/103 |
| 2010/0211290 A1 * | 8/2010 | Kidokoro et al. | 701/103 |
| 2012/0006307 A1 * | 1/2012 | Demura | 123/674 |
| 2012/0022772 A1 * | 1/2012 | Miyamoto et al. | 701/104 |

(Continued)

FOREIGN PATENT DOCUMENTS

| | | |
|---|---|---|
| JP | 60-184946 A | 9/1985 |
| JP | 04224259 A | 8/1992 |
| JP | 08-049585 A | 2/1996 |
| JP | 2003-106198 A | 4/2003 |
| JP | 2004-052620 A | 2/2004 |
| JP | 2008-202563 A | 9/2008 |
| JP | 2009-074388 A | 9/2009 |
| JP | 2010180746 A | 8/2010 |

OTHER PUBLICATIONS

Partial translation of the Office Action drafted on Jan. 29, 2013 for Japanese Patent Application No. 2011-031047.

*Primary Examiner* — Thomas Moulis
(74) *Attorney, Agent, or Firm* — Gifford, Krass, Sprinkle, Anderson & Citkowski, P.C.

(57) ABSTRACT

An inter-cylinder air-fuel ratio imbalance abnormality determination device includes a catalyst provided in an exhaust passage of a multi-cylinder internal combustion engine; a pre-catalyst sensor; a post-catalyst sensor; an air-fuel ratio control unit that performs main air-fuel ratio control based on an output of the pre-catalyst sensor and auxiliary air-fuel ratio control based on an output of the post-catalyst sensor; a control amount calculation unit that calculates a control amount in the auxiliary air-fuel ratio control based on the output of the post-catalyst sensor; a revolution speed variation detection unit that detects a revolution speed variation of the engine; an abnormality determination unit that performs imbalance abnormality determination for determining whether an inter-cylinder air-fuel ratio imbalance abnormality has occurred based on a detected value of the revolution speed variation; and a guard range reduction unit that reduces a guard range of the control amount during the imbalance abnormality determination.

6 Claims, 12 Drawing Sheets

(56) References Cited

U.S. PATENT DOCUMENTS

| | | | |
|---|---|---|---|
| 2012/0035831 A1* | 2/2012 | Kidokoro et al. | 701/104 |
| 2012/0109497 A1* | 5/2012 | Anzawa | 701/103 |
| 2013/0006505 A1* | 1/2013 | Shinagawa et al. | 701/108 |
| 2013/0006506 A1* | 1/2013 | Takada et al. | 701/108 |
| 2013/0060449 A1* | 3/2013 | Bagnasco et al. | 701/103 |

\* cited by examiner

INTER-CYLINDER AIR-FUEL RATIO IMBALANCE ABNORMALITY DETERMINATION DEVICE

CROSS REFERENCE TO RELATED APPLICATIONS

This application claims priority to Japanese Patent Application No. 2011-031047 filed on Feb. 16, 2011, which is incorporated herein by reference in its entirety including the specification, drawings and abstract.

BACKGROUND OF THE INVENTION

1. Field of the Invention

The invention relates to a device that determines whether or not an inter-cylinder air-fuel (A/F) ratio imbalance abnormality has occurred, and more particularly to a device that determines whether or not a relatively large imbalance of A/F ratio between the cylinders has occurred in a multi-cylinder internal combustion engine.

2. Description of Related Art

In an internal combustion engine provided with an exhaust gas control system using a catalyst, it is generally necessary to control a mixing ratio of air and fuel in a mixed gas burned in the internal combustion engine, that is, to control the A/F ratio in order to perform highly efficient catalytic purification of pollutants present in the exhaust gas. In order to perform such control of A/F ratio, an A/F ratio sensor is provided in an exhaust gas passage of the internal combustion engine and feedback control is performed such as to match the A/F ratio detected by the sensor with a predetermined target A/F ratio.

In a multi-cylinder internal combustion engine, the A/F ratio control is usually performed by using the same control amount for all of the cylinders. Therefore, the actual A/F ratio may vary between the cylinders even when the A/F ratio control is implemented. Where the degree of such imbalance is small, it can be absorbed by the A/F ratio feedback control and the processing of purifying pollutants contained in the exhaust gas can be performed with the catalyst. As a result, no effect is produced on exhaust gas emission and no problem is associated with such imbalance.

However, where the inter-cylinder imbalance of A/F ratio is large, for example, due to a failure of the fuel injection system of some cylinders, the exhaust gas emission is degraded, thereby causing problems. It is desirable that such a large imbalance of A/F ratio that causes degradation of exhaust gas emission be detected as an abnormality. In particular, in the case of internal combustion engines for automobiles, it is required that the inter-cylinder imbalance abnormality of A/F ratio be detected in the onboard state in order to prevent reliably the vehicle from running with degraded exhaust gas emission, and there is a recent trend to regulate such detection by law.

For example, in the device described in Japanese Patent Application Publication No. 2004-52620 (JP-A-2004-52620), the inter-cylinder imbalance value is calculated for each cylinder on the basis of variations in revolution speed of the internal combustion engine.

In the A/F ratio feedback control, a pre-catalyst sensor and a post-catalyst sensor may be provided as A/F ratio sensors upstream and downstream of the catalyst, respectively, the main A/F ratio control may be performed on the basis of the pre-catalyst sensor output and the auxiliary A/F ratio control may be performed on the basis of post-catalyst sensor.

Further, a prescribed guard range is typically provided in order to prevent the values of the control amount for the auxiliary A/F ratio control from being excessive.

Meanwhile, it is conceivable to detect the revolution speed variations in the internal combustion engine and to determine whether or not an inter-cylinder A/F ratio imbalance abnormality has occurred on the basis of the detected value.

The research results obtained by the inventor have demonstrated that in such a case there is a correlation between the auxiliary A/F ratio control amount and revolution speed variations, and where the absolute value of the auxiliary A/F ratio control amount increases to the vicinity of the guard value of the prescribed guard range, erroneous determination may occur when the imbalance abnormality is determined.

SUMMARY OF THE INVENTION

The invention provides an inter-cylinder air-fuel ratio imbalance abnormality determination device that prevents erroneous determination when imbalance abnormality determination is performed.

One aspect of the invention relates to an inter-cylinder air-fuel ratio imbalance abnormality determination device, including: a catalyst that is provided in an exhaust passage of a multi-cylinder internal combustion engine; a pre-catalyst sensor that is an air-fuel ratio sensor provided upstream of the catalyst; a post-catalyst sensor that is an air-fuel ratio sensor provided downstream of the catalyst; an air-fuel ratio control unit that performs main air-fuel ratio control based on an output of the pre-catalyst sensor and auxiliary air-fuel ratio control based on an output of the post-catalyst sensor; a control amount calculation unit that calculates a control amount in the auxiliary air-fuel ratio control based on the output of the post-catalyst sensor; a revolution speed variation detection unit that detects a revolution speed variation of the internal combustion engine; an abnormality determination unit that performs imbalance abnormality determination for determining whether or not an inter-cylinder air-fuel ratio imbalance abnormality has occurred on the basis of a detected value of the revolution speed variation; and a guard range reduction unit that reduces a guard range of the control amount in the course of the imbalance abnormality determination.

In the above-described aspect, the abnormality determination unit may perform lean-deviation abnormality determination for determining, on the basis of the detected value of the revolution speed variation, whether or not a lean-deviation abnormality has occurred in which an air-fuel ratio of at least one cylinder has deviated to a lean side with respect to air-fuel ratios of other cylinders; and the guard range reduction unit may reduce a guard range of the control amount in the course of the lean-deviation abnormality determination.

In the above-described aspect, the guard range reduction unit may reduce the guard range of the control amount at the same time as a start of the imbalance abnormality determination; and when the control amount immediately before the start of the imbalance abnormality determination is outside the reduced guard range, the air-fuel ratio control unit may perform the auxiliary air-fuel ratio control during the imbalance abnormality determination by using a guard value that is the closest to the control amount immediately before the start of the imbalance abnormality determination, as the control amount.

In the above-described aspect, the guard range reduction unit may return the guard range of the control amount to the original prescribed guard range at the same time as an end of the imbalance abnormality determination; and the air-fuel ratio control unit may start the auxiliary air-fuel ratio control after the end of the imbalance abnormality determination by using the control amount immediately before the start of the imbalance abnormality determination, as the control amount.

In the above-described aspect, the abnormality determination unit may determine that the inter-cylinder air-fuel ratio imbalance abnormality has occurred when the detected value of the revolution speed variation is equal to or greater than a predetermined abnormality determination value.

In the above-described aspect, the revolution speed variation detection unit may detect the revolution speed variation for each cylinder of the internal combustion engine.

The aforementioned aspect of the invention demonstrates an excellent effect of preventing erroneous determination during the imbalance abnormality determination.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the invention will be described below with reference to the appended drawings.

Figure 1:
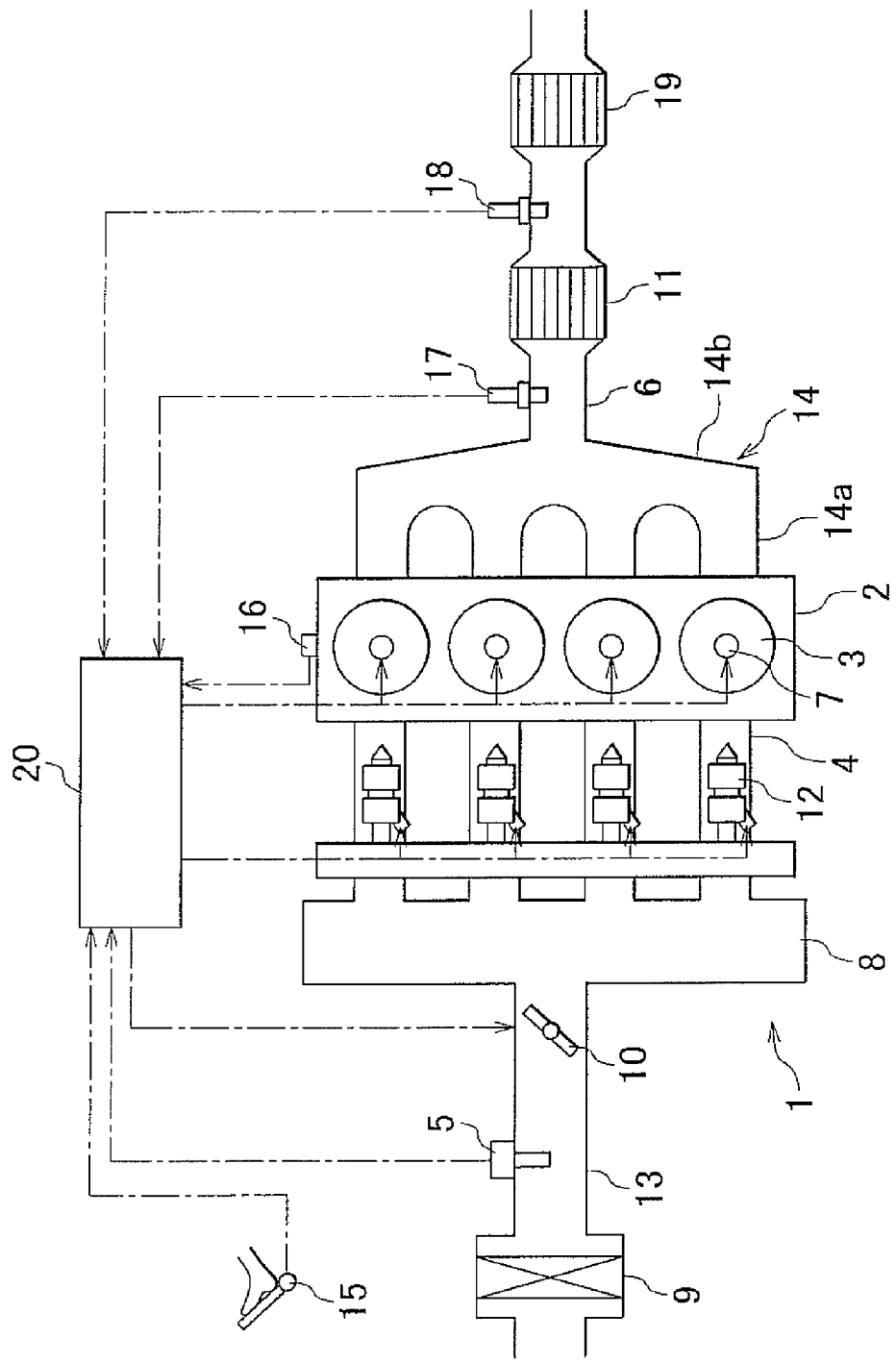
FIG. 1 is a schematic diagram of an internal combustion engine according to an embodiment of the invention.

FIG. 1 is a schematic drawing of an internal combustion engine according to the embodiment. As shown in the figure, an internal combustion engine (engine) 1 generates power by burning a mixed gas of fuel and air inside a combustion chamber 3 formed in a cylinder block 2 and causing pistons to perform reciprocating movement inside the combustion chamber 3. The internal combustion engine 1 of the embodiment is a multi-cylinder internal combustion engine installed on an automobile, more specifically an in-line four-cylinder spark-ignited internal combustion engine. The internal combustion engine 1 includes cylinders #1 to #4. However, the number of cylinders and engine type are not particularly limited.

The cylinder head of each cylinder of the internal combustion engine 1 is provided with an intake valve that opens and closes an intake port and an exhaust valve that opens and closes an exhaust port, and the intake valves and exhaust valves are opened and closed by a valve operating mechanism including a camshaft (this configuration is not shown in the figures). A sparkplug 7 for igniting the mixed gas inside the combustion chamber 3 is provided at the top portion of cylinder head in each cylinder.

The intake port of each cylinder is connected by a branch pipe 4 provided for each cylinder to a surge tank 8 serving as an intake air collecting chamber. An intake pipe 13 is connected to the upstream portion of the surge tank 8, and an air cleaner 9 is provided at the upstream end of the intake pipe 13. An air flowmeter 5 for detecting the intake air amount and an electronically controlled throttle valve 10 are provided in the intake pipe 13 in the stated order from the upstream side. The intake port, branch pipe, surge tank 8, and intake pipe 13 form an intake passage.

An injector (fuel injection valve) 12 that injects fuel into the intake passage, in particular into the intake port, is provided for each cylinder. The fuel injected from the injector 12 is mixed with the intake air, thereby forming a mixed gas. The mixed gas is sucked into the combustion chamber 3 when the intake valve is open, compressed by the piston, ignited by the sparkplug 7, and burned.

The exhaust port of each cylinder is connected to an exhaust manifold 14. The exhaust manifold 14 is constituted by branch pipes 14a (one for each cylinder) that constitute the upstream portion of the exhaust manifold and an exhaust collector 14b constituting the downstream portion thereof. An exhaust pipe 6 is connected to the downstream portion of the exhaust collector 14b. The exhaust ports, exhaust manifold 14, and exhaust pipe 6 form an exhaust passage.

Catalysts configured by three-way catalysts, namely, an upstream catalyst 11 and a downstream catalyst 19, are mounted in series at the upstream side and the downstream side of the exhaust pipe 6, respectively. First and second A/F ratio sensors, that is, a pre-catalyst sensor 17 and a post-catalyst sensor 18, for detecting the A/F ratio of exhaust gas are provided upstream and downstream of the upstream catalyst 11, respectively. These pre-catalyst sensor 17 and post-catalyst sensor 18 are provided at positions immediately before and immediately after the upstream catalyst 11 and detect the A/F ratio on the basis of oxygen concentration in the exhaust gas. Thus, the single pre-catalyst sensor 17 is provided in the exhaust gas merging section upstream of the upstream catalyst 11.

The aforementioned sparkplug 7, throttle valve 10, injector 12, and the like are electrically connected to an electronic control unit (referred to hereinbelow as ECU) 20 that controls the sparkplug 7, throttle valve 10, injector 12, and the like. The ECU 20 includes a central processing unit (CPU), a read only memory (ROM), a random access memory (RAM), input/output ports, and a storage device (none of them is shown in the figure). Further, as shown in the figure, a crank angle sensor 16 that detects the crank angle of the internal combustion engine 1, an accelerator operation amount sensor 15 that detects the accelerator operation amount, and other various sensors are electrically connected by means of an analogue-to-digital (A/D) converter (not shown in the figure)

or the like, in addition to the aforementioned air flowmeter 5, pre-catalyst sensor 17, and post-catalyst sensor 18, to the ECU 20. On the basis of the detection values of these sensors, the ECU 20 controls the sparkplug 7, throttle valve 10, injector 12, and the like, thereby controlling the ignition timing, fuel injection amount, fuel injection timing, and throttle opening degree, so as to obtain the desired output. The throttle opening degree is usually controlled to a value corresponding to the accelerator operation amount.

Figure 2:
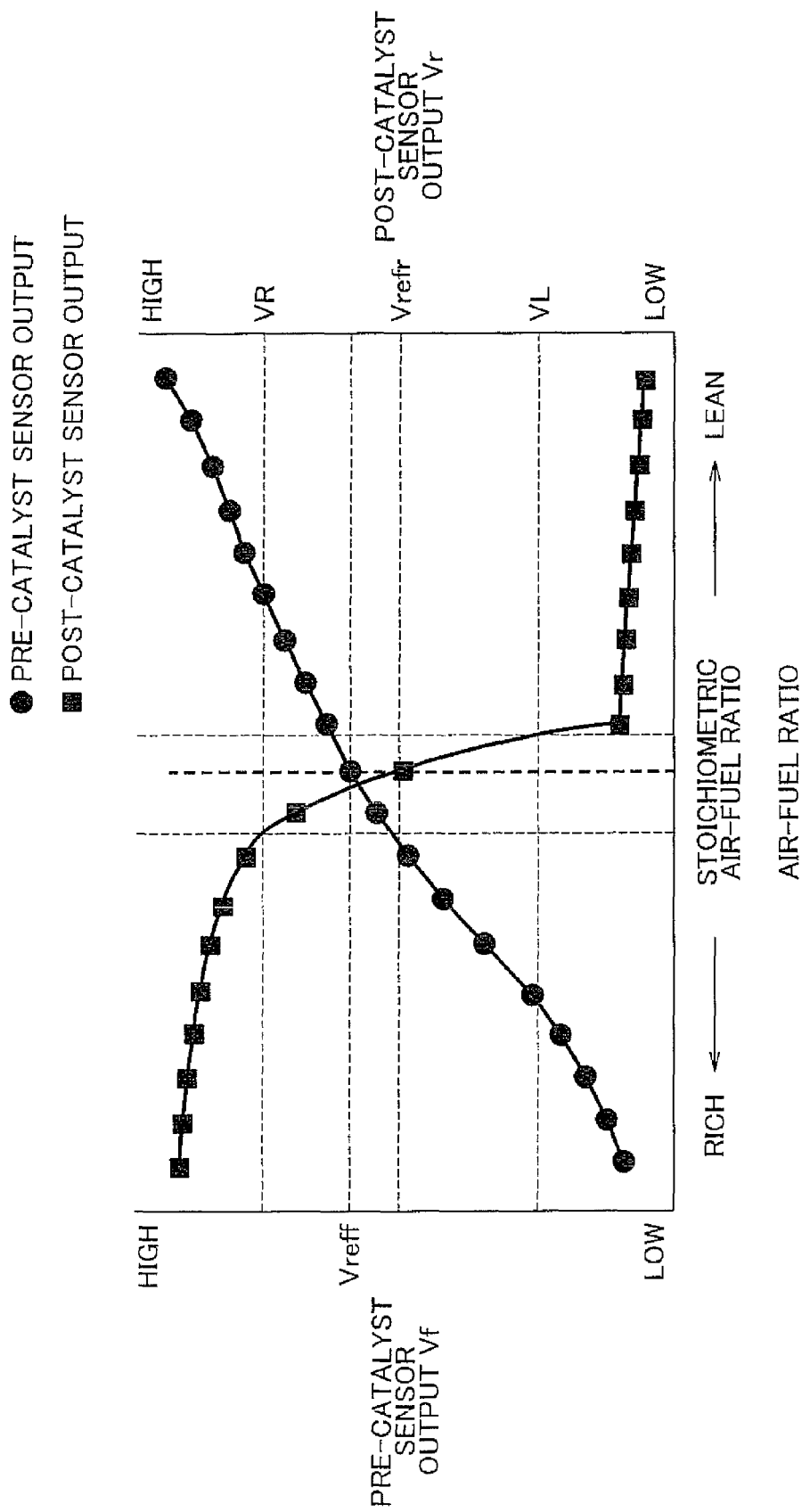
FIG. 2 is a graph illustrating output characteristics of a pre-catalyst sensor and a post-catalyst sensor.

The pre-catalyst sensor 17 is constituted by the so-called wide-range A/F ratio sensor and can continuously detect the A/F ratio within a comparatively wide range. FIG. 2 shows an output characteristic of the pre-catalyst sensor 17. As shown in the figure, the pre-catalyst sensor 17 outputs a voltage signal Vf of a size proportional to the exhaust A/F ratio. The output voltage at the time the exhaust A/F ratio is stoichiometric (stoichiometric A/F ratio, for example, A/F=14.6) is Vreff (for example, about 3.3 V).

Meanwhile, the post-catalyst sensor 18 is the so-called $O_2$ sensor and has a characteristic in which the output value changes sharply around a stoichiometric value as a boundary. FIG. 2 shows the output characteristic of the post-catalyst sensor 18. As shown in the figure, the output voltage at the time the exhaust A/F ratio is stoichiometric, that is, the value corresponding to the stoichiometric state, is Vrefr (for example, 0.45 V). The output voltage of the post-catalyst sensor 18 changes within a predetermined range (for example, 0 V to 1 V). Where the exhaust A/F ratio is leaner that the stoichiometric value, the output voltage of the post-catalyst sensor becomes less than the value Vrefr corresponding to the stoichiometric state, and when the exhaust A/F ratio is richer than the stoichiometric value, the output voltage of the post-catalyst sensor becomes higher than the value Vrefr corresponding to the stoichiometric state.

The upstream catalyst 11 and downstream catalyst 19 simultaneously purify NOx, HC, and CO, which are pollutants contained in the exhaust gas, when the A/F ratio A/F of the exhaust gas flowing to the catalysts is close to the stoichiometric value. The range (window) of A/F ratio in which the three aforementioned compounds can be purified simultaneously with high efficiency is comparatively narrow.

The A/F ratio feedback control (stoichiometric control) is implemented by the ECU 20 so as to control the A/F ratio of the exhaust gas flowing to the upstream catalyst 11 to the vicinity of the stoichiometric value. The A/F ratio control is constituted by main A/F ratio control (main A/F ratio feedback control) that matches the exhaust A/F ratio detected by the pre-catalyst sensor 17 with the stoichiometric value which is a predetermined target A/F ratio and auxiliary A/F ratio control (auxiliary A/F ratio feedback control) that matches the exhaust A/F ratio detected by the post-catalyst sensor 18 with the stoichiometric value.

Figure 3:
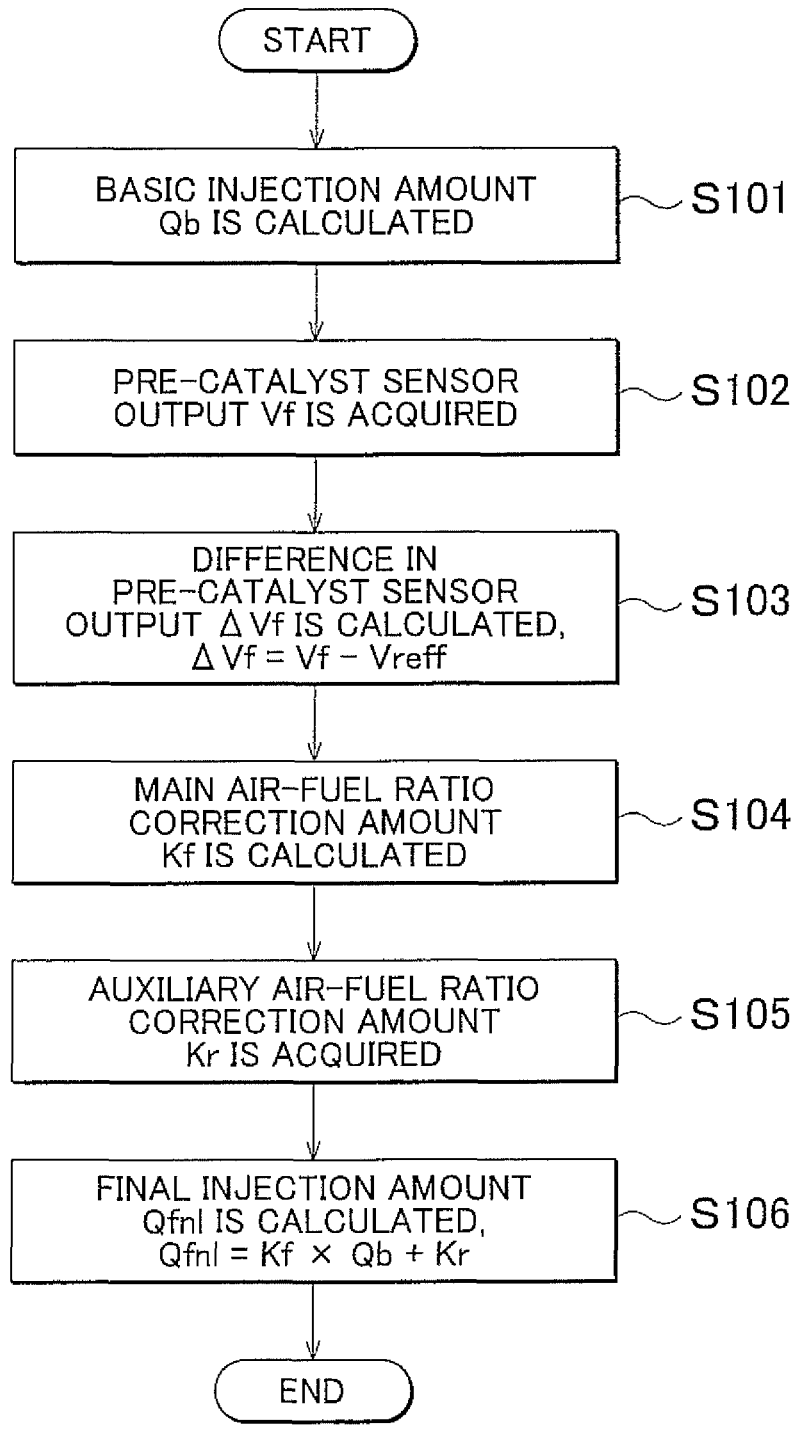
FIG. 3 is a flowchart illustrating the main routine of A/F ratio control.

The stoichiometric control is explained below. FIG. 3 shows the main routine of the stoichiometric control. The main routine is performed by the ECU 20 periodically for each engine cycle (=720° CA).

First, in step S101, a basic fuel injection amount that makes the A/F ratio of the mixed air inside the cylinder equal to the stoichiometric A/F ratio, that is, a basic injection amount Qb, is calculated. The basic injection amount Qb is calculated, for example, on the basis of the intake A/F ratio Ga detected by the air flowmeter, by the formula: Qb=Ga/14.6.

In step S102, the output Vf of the pre-catalyst sensor 17 is acquired. In step S103, the difference between the sensor output Vf and the stoichiometry-corresponding sensor output Vreff (see FIG. 2), which is the output value of the pre-catalyst sensor 17 corresponding to stoichiometry, that is, the pre-catalyst sensor output difference ΔVf=Vf−Vreff, is calculated.

Figure 4:
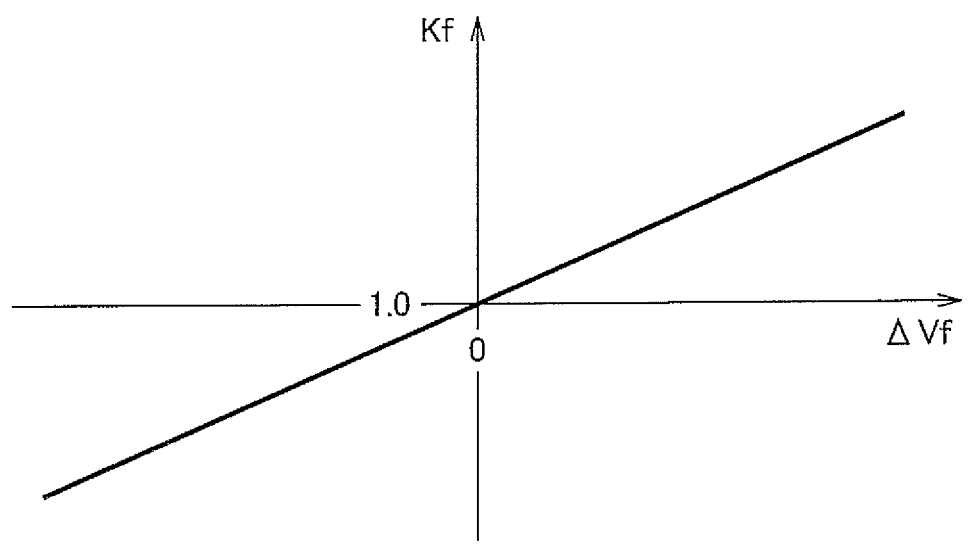
FIG. 4 is a computation map for a main A/F ratio correction amount.

In step S104, a main A/F ratio correction amount (correction coefficient) Kf is calculated from a map (may be a function; same hereinbelow), such as shown in FIG. 4, on the basis of the pre-catalyst sensor output difference ΔVf. The pre-catalyst sensor output difference ΔVf and the main A/F ratio correction amount Kf are control parameters for the main A/F ratio control. For example, where a gain is denoted by Pf, Kf can be represented as Kf=Pf×ΔVf.

Figure 5:
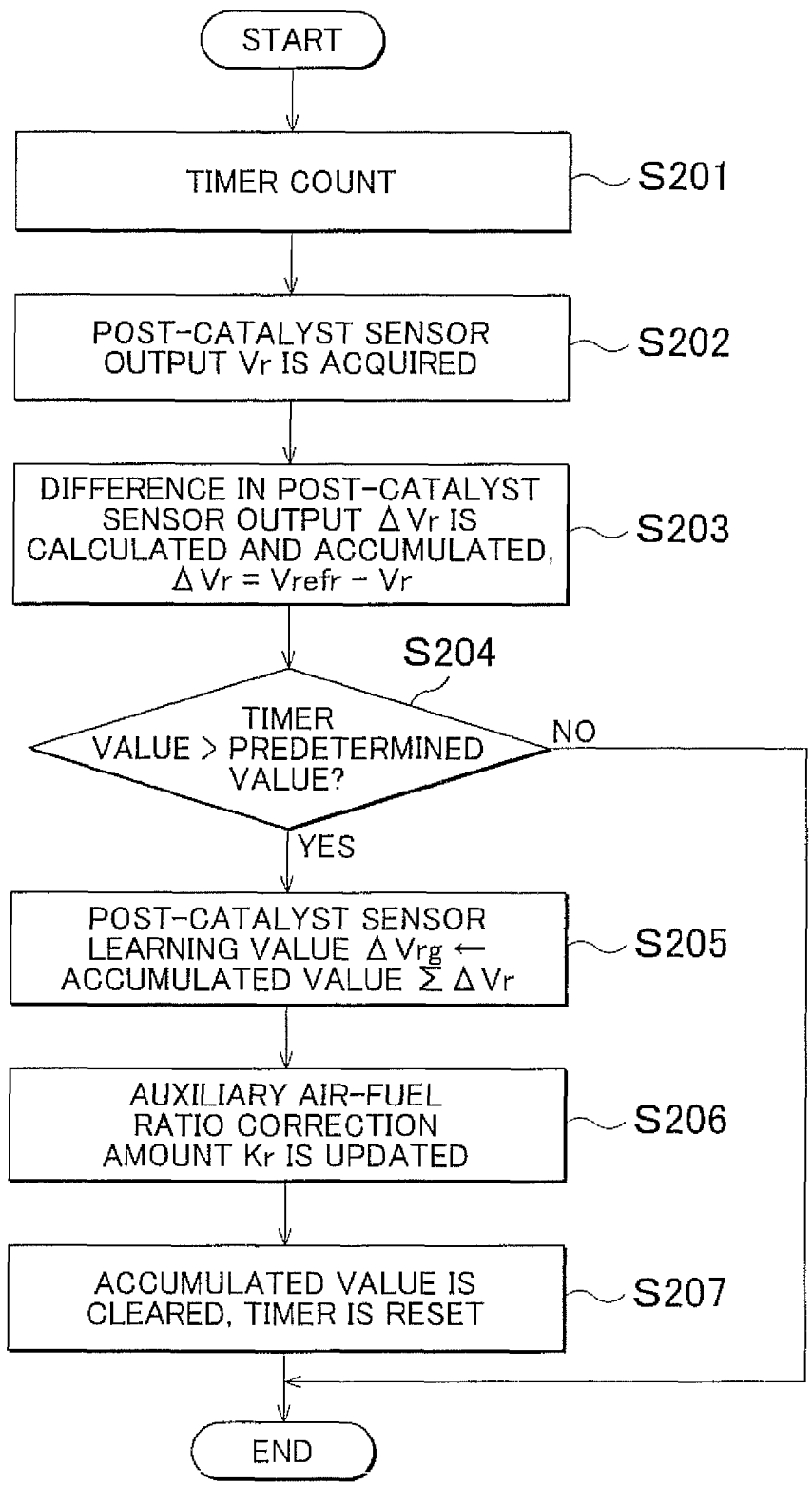
FIG. 5 is a flowchart illustrating the sub-routine for setting an auxiliary A/F ratio correction amount.

Then, in step S105, the value of an auxiliary A/F ratio correction amount Kr that has been set in the sub-routine shown in FIG. 5 is acquired. Finally, in step S106, a final fuel injection amount that should be injected from the injector 2, that is, a final injection amount Qfn1, is calculated by the following formula: Qfn1=Kf×Qb+Kr.

According to the map shown in FIG. 4, as the pre-catalyst sensor output Vf becomes larger than the stoichiometry-corresponding sensor output Vreff (ΔVf>0) by a larger value, that is, as the actual pre-catalyst A/F ratio deviates to the lean side from the stoichiometric A/F ratio, the correction coefficient Kf increases from 1 and the basic injection amount Qb is corrected to increase. Conversely, as the pre-catalyst sensor output Vf becomes smaller than the stoichiometry-corresponding sensor output Vreff (ΔVf<0) by a larger value, that is, as the actual pre-catalyst A/F ratio deviates to the rich side from the stoichiometric A/F ratio, the correction coefficient Kf decreases from 1 and the basic injection amount Qb is corrected to decrease. The main A/F ratio feedback control is thus implemented such that the A/F ratio detected by the pre-catalyst sensor 17 is matched with the stoichiometric A/F ratio.

The value of the final injection amount Qfn1 obtained in step S106 is used uniformly with respect to all of the cylinders to be controlled. Thus, the fuel in an amount equal to the final injection amount Qfn1 is successively injected from the injector 12 of each cylinder within one engine cycle, and the fuel in the final injection amount Qfn1 calculated anew is successively injected from the injector 2 of each cylinder in the next engine cycle.

As generally known, other corrections (coolant temperature correction, battery voltage correction, and the like) may be additionally performed when the final injection amount Qfn1 is calculated.

FIG. 5 shows a sub-routine for setting the auxiliary A/F ratio correction amount. This sub-routine is repeatedly implemented by the ECU 20 at intervals of a predetermined calculation period.

Figure 6:
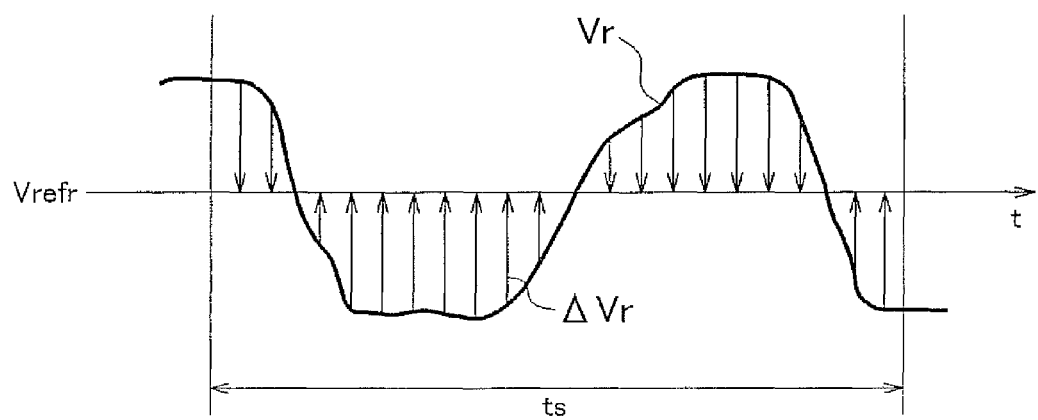
FIG. 6 is a time chart illustrating the difference in output of the post-catalyst sensor and an accumulation method thereof.

First, in step S201, the count of the timer provided in the ECU 20 is performed, and in step S202, an output Vr of the post-catalyst sensor 18 is acquired. In step S203, a difference between the sensor output Vr and a stoichiometry-corresponding sensor output Vrefr (see FIG. 2), which is an output value of the post-catalyst sensor 18 corresponding to the stoichiometric ratio, that is, a post-catalyst sensor output difference ΔVr=Vrefr−Vr, is calculated. This post-catalyst sensor output difference ΔVr is added to the previous accumulated value. FIG. 6 shows the details of this post-catalyst sensor output difference ΔVr and accumulation thereof.

Figure 7:
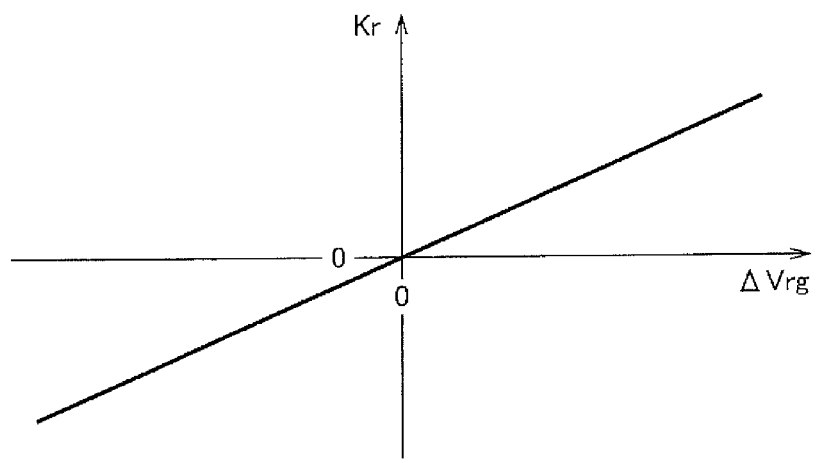
FIG. 7 is a computation map for the auxiliary A/F ratio correction amount.

In step S204, it is determined whether or not the timer value exceeds a predetermined value ts. Where the predetermined value ts has not been exceeded, the routine is ended.

Where the timer value has exceeded the predetermined value ts, in step S205, a post-sensor output difference accumulated value ΣΔVr at this point in time is stored as an updated post-catalyst sensor learning value ΔVrg, that is, learned. Then, in step S206, the auxiliary A/F ratio correction amount Kr is calculated from the map, such as shown in FIG. 7, on the basis of this post-catalyst sensor learning value ΔVrg, and this auxiliary A/F ratio correction amount Kr is updated and stored, that is, learned. The post-catalyst sensor learning value ΔVrg and the auxiliary A/F ratio correction amount Kr are control amounts in the auxiliary A/F ratio control. For example, where a gain is denoted by Pr, the auxiliary A/F ratio correction amount can be represented as Kr=Pr×ΔVrg. Finally, in step S207, the post-sensor output difference accumulated value ΣΔVr and the timer are reset.

The post-catalyst sensor learning value ΔVr is accumulated within the predetermined time interval ts in order to detect the time-average deviation amount of the post-catalyst sensor output Vr with respect to the stoichiometry-corresponding sensor output Vrefr. The predetermined value ts that defines the accumulation interval is much longer than one engine cycle. Therefore, the post-catalyst sensor learning value ΔVrg and the auxiliary A/F ratio correction amount Kr are updated with a period longer than one engine cycle.

According to the map shown in FIG. 7, as the post-catalyst sensor output Vr that is averaged over time becomes smaller than the stoichiometry-corresponding sensor output Vrefr (ΔVrg>0) by a larger value, that is, as the actual post-catalyst A/F ratio deviates to the lean side from the stoichiometric A/F ratio, the correction amount Kr increases from 0 and the basic injection amount Qb is corrected to increase when the final injection amount is calculated. Conversely, as the post-catalyst sensor output Vr that is averaged over time becomes larger than the stoichiometry-corresponding sensor output Vrefr (ΔVrg<0) by a larger value, that is, as the actual post-catalyst A/F ratio deviates to the rich side from the stoichiometric A/F ratio, the correction amount Kr decreases from 0 and the basic injection amount Qb is corrected to decrease when the final injection amount is calculated. The auxiliary A/F ratio feedback control is thus executed so as to match the post-catalyst A/F ratio detected by the post-catalyst sensor 21 with the stoichiometric A/F ratio.

Due to variations among individual engines and individual vehicles and also the degradation of the pre-catalyst sensor 17, even when the main A/F ratio feedback control is performed, the result thereof may differ from the stoichiometric A/F ratio. Therefore, the auxiliary A/F ratio feedback control is performed to correct this difference.

In the example, the values of the learning value ΔVrg and correction amount Kr are updated to newly calculated values each time the new learning value ΔVrg and correction amount Kr are calculated, but the update rate may be decreased by performing an averaging process such as smoothing.

Further, for example, the case will be considered in which injectors 12 in at least one cylinder (in particular, one cylinder) from among all of the cylinders have failed and an A/F ratio imbalance has occurred between the cylinders. As an example, the case will be considered in which the fuel injection amount in cylinder #1 became less than that in cylinders #2, #3, and #4 and the A/F ratio deviated significantly to the lean side. In such a case, the A/F ratio of the total gas supplied to the pre-catalyst sensor 17 can still be controlled to the stoichiometric value if a comparatively large correction amount is imparted by the aforementioned main A/F ratio feedback control. However, where the cylinders are considered separately, it is clear that the cylinder #1 has an A/F ratio significantly leaner than the stoichiometric value and the cylinders #2, #3, and #4 have an A/F ratio richer than the stoichiometric value, and that the stoichiometric value is merely obtained as a total balance. This state is undesirable from the standpoint of emission. Accordingly, in the embodiment, the device is provided to determine whether or not such an inter-cylinder A/F ratio imbalance abnormality has occurred.

The term "imbalance ratio" (%), which is used for the sake of convenience as a parameter representing the value of imbalance degree, is explained below. When a fuel injection amount deviation has occurred in only one cylinder from among all the cylinders, the imbalance ratio represents a degree to which the fuel injection amount in the cylinder (imbalance cylinder), in which the fuel injection amount deviation has occurred, has deviated with respect to the fuel injection amount in the cylinders (balance cylinders) in which the fuel injection amount deviation has not occurred, that is, the reference injection amount. Where the imbalance ratio is denoted by IB, the fuel injection amount in the imbalance cylinder is denoted by Qib, and the fuel injection amount in the balance cylinders, that is, the reference injection amount, is denoted by Qs, the imbalance ratio is represented by the following equation: IB=(Qib−Qs)/Qs. As the imbalance ratio IB becomes larger, the deviation of the fuel injection amount in the imbalance cylinder with respect to that in the balance cylinder becomes larger, and the degree of the A/F ratio imbalance also becomes larger.

Figure 8:
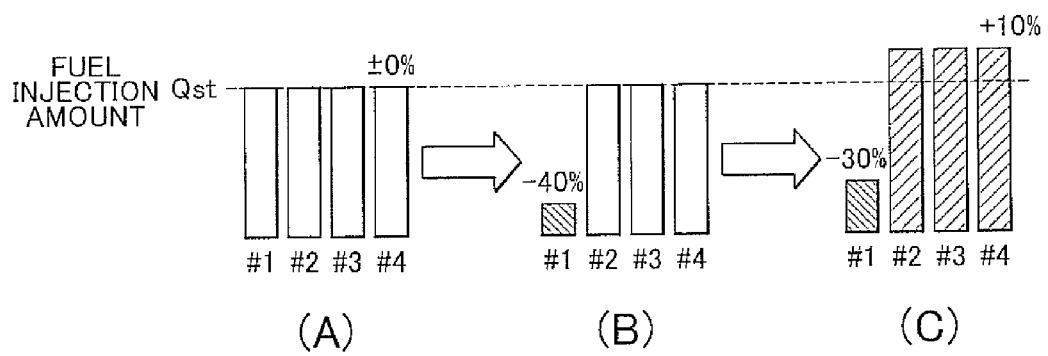
FIG. 8 is a graph illustrating changes in a fuel injection amount in each cylinder when a lean-deviation abnormality has occurred.

FIG. 8 shows changes in the fuel injection amount of each cylinder when a lean-deviation abnormality, such that the fuel injection amount of only one cylinder is too small, has occurred as a A/F ratio imbalance abnormality.

A portion (A) in FIG. 8 shows the fuel injection amount in each cylinder before an abnormality has occurred, that is, when the fuel injection amount in each cylinder is normal. In this case, the fuel injection amount in each cylinder has become the stoichiometry-corresponding amount Qst as a result of the aforementioned stoichiometry control. This stoichiometry-corresponding amount Qst is the aforementioned reference injection amount Qs, and the imbalance ratio of cylinders #1, #2, #3, and #4 is ±0%.

A portion (B) in FIG. 8 shows the fuel injection amount in each cylinder at a time point at which the abnormality occurs. In this case, the fuel injection amount in the cylinder #1 is less than the stoichiometry-corresponding amount Qst, and the fuel injection amount in the other cylinders #2, #3, #4 is the stoichiometry-corresponding amount Qst. For example, as shown in the figure, the imbalance ratio of the cylinder #1 is −40%, and the imbalance ratio of the cylinders #2, #3, #4 is ±0%. The cylinder #1 is an abnormal cylinder that causes an imbalance abnormality, and the cylinders #2, #3, #4 are normal cylinders.

Where the aforementioned stoichiometry control is performed in this state, the fuel injection amounts in all the cylinders are uniformly corrected to increase by 10% so that the A/F ratio of the total gas (exhaust gas from all the cylinders) supplied to the pre-catalyst sensor 17 is the stoichiometric A/F ratio. Thus, although only cylinder #1 has deviated to the lean side by 40%, the effect on the pre-catalyst sensor 17 is 10% obtained by dividing 40% by the number of cylinders, that is, by 4, the information indicating that a 10% lean deviation has occurred is obtained from the pre-catalyst sensor 17, and the ECU 20 uniformly corrects the fuel injection amounts in all the cylinder to increase by 10%.

Where a certain time interval has elapsed since the correction to increase the fuel injection amounts is started, the fuel injection amount in each cylinder changes as shown in a portion (C) in FIG. 8, the fuel injection amount in the cylinder #1 causes a lean state, and is less by an equivalent of 30% than the stoichiometry-corresponding amount Qst, and the fuel injection amount in the cylinders #2, #3, #4 causes a rich state, and is greater by an equivalent of 10% than the stoichiometry-corresponding amount Qst. In other words, as shown in the figure, the imbalance ratio of the cylinder #1 is −30% and the imbalance ratio of the cylinders #2, #3, #4 is +10%.

Thus, even when a certain time interval has elapsed since the abnormality occurs, the A/F ratio variation or imbalance among the cylinders is not eliminated and there are the cylinders in which the A/F ratios are richer and leaner than the stoichiometry.

In addition to the lean-deviation abnormality, a rich-deviation abnormality, in which the fuel injection amount in only one cylinder is extremely large, may occur. In the embodiment, it is determined whether or not the lean-deviation abnormality has occurred. However, the invention can be also applied to the rich-deviation abnormality. Whether or not the lean-deviation abnormality has occurred is determined by the following method on the basis of revolution speed variation of the engine 1.

Figure 9:
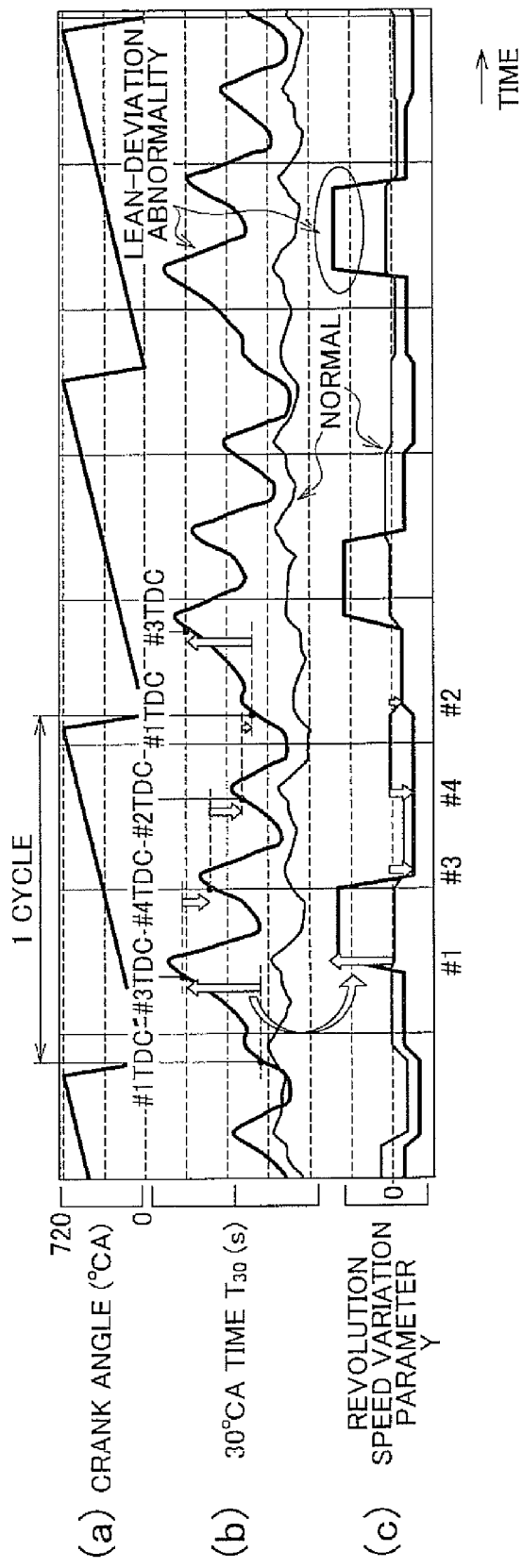
FIG. 9 is a time chart for explaining a revolution speed variation parameter.

In FIG. 9, a portion (a) shows a crank angle (° CA), a portion (b) shows a 30° CA time $T_{30}$ (s), and a portion (c) shows a revolution speed variation parameter Y. The revolution speed variation parameter Y as referred to herein is a parameter representing the magnitude of the revolution speed variation of the engine 1; this parameter is detected by the below-described method. The ignition is performed in the order of the cylinders #1, #3, #4, #2. In the figure, "NORMAL" indicates a normal case where an A/F ratio deviation has occurred in none of the cylinders, and "LEAN-DEVIATION ABNORMALITY" indicates a case in which a lean-deviation abnormality with an imbalance ratio IB=−30(%) has occurred only in cylinder #1.

The 30° CA time $T_{30}$ as referred to herein is a time required for the crankshaft to rotate by 30° CA; this time is detected on the basis of the output signal from the crank angle sensor 16. The longer (larger) the 30° CA time $T_{30}$ becomes, the lower the revolution speed of the crankshaft and engine becomes. The revolution speed variation parameter Y represents the difference in the 30° CA time $T_{30}$ in the interval from the TDC (top dead center) of the previously ignited cylinder to the TDC of the presently ignited cylinder, that is, the difference between the 30° CA time $T_{30}$ at the TDC of the previously ignited cylinder and the 30° CA time $T_{30}$ at the TDC of the presently ignited cylinder.

First, the case of lean-deviation abnormality will be described. In the example shown in the figure, a lean-deviation abnormality has occurred in cylinder #1. Therefore, as shown in the portion (b), although cylinder #1 is ignited, sufficient combustion or sufficient torque is not obtained and at a point of time of the TDC in the cylinder #3, which is the next ignited cylinder, the 30° CA time $T_{30}$ increases. Accordingly, the difference in the 30° CA time $T_{30}$ in the interval from the TDC of the cylinder #1 to the TDC of the cylinder #3 is large, and the value of the revolution speed variation parameter Y shown in the portion (c) increases.

By contrast, the cylinder other than the cylinder #1, for example, cylinder #3, is normal and, as shown in the portion (b), the difference in the 30° CA time $T_{30}$ in the interval from the TDC of cylinder #3 to the TDC of cylinder #4 is small and the revolution speed variation parameter Y shown in the portion (c) is small.

The normal case will be considered hereinbelow. Since all the cylinders are normal, the variation in combustion among the cylinders is small and, as shown in the portion (b), the difference in the 30° CA time $T_{30}$ in each interval from the TDC of the previously ignited cylinder to the TDC of the presently ignited cylinder is small and almost constant and the value of the revolution speed variation parameter Y shown in the portion (c) is small and substantially close to zero at all times.

In other words, in the normal case, the revolution speed variation is small and the value of the revolution speed variation parameter Y is small at all times, but in the abnormal case, the revolution speed variation is large, and the value of the revolution speed variation parameter Y corresponding to the abnormal cylinder increases. Therefore, by detecting the revolution speed variation parameter Y for each cylinder and comparing the detected value of the revolution speed variation parameter Y for each cylinder with a predetermined abnormality determination value, it is possible to determine whether or not a lean-deviation abnormality has occurred.

In the embodiment, the ECU 20 detects the revolution speed variation parameter Y for each cylinder on the basis of the output of the crank angle sensor 16. When the detected value of the revolution speed variation parameter Y for each cylinder is smaller than the abnormality determination value, it is determined that no lean-deviation abnormality has occurred, that is, that the normal state is realized. By contrast, where there is the detected value of the revolution speed variation parameter Y, which is equal to or greater than the abnormality determination value, it is determined that a lean-deviation abnormality has occurred and the cylinder corresponding to this detected value is determined as an abnormal cylinder. An average value of a plurality of detected values of the revolution speed variation parameter Y may be used as the detected value of the revolution speed variation parameter Y.

Where a lean-deviation abnormality occurs in a certain cylinder, sufficient torque is not obtained after combustion in this cylinder and the rise in revolution is degraded. As a consequence, the revolution does not rise uniformly after combustion in each cylinder, and the revolution speed variation in all the cylinders or the revolution speed variation in each engine cycle increases.

Figure 10:
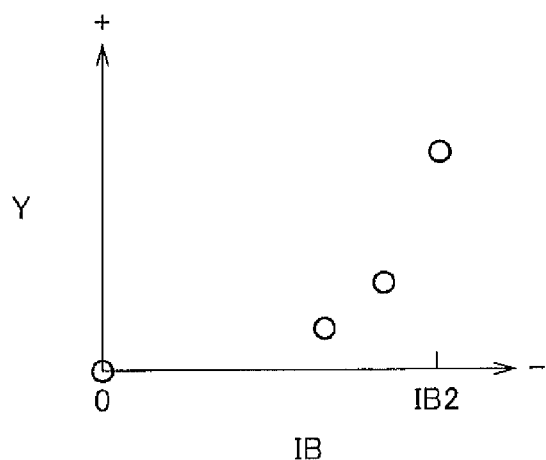
FIG. 10 is a graph illustrating the relationship between an imbalance ratio and the revolution speed variation parameter.

FIG. 10 shows the relationship between the imbalance ratio IB and the revolution speed variation parameter Y. As shown in the figure, there is a strong correlation between the imbalance ratio IB and the revolution speed variation parameter Y, and as the imbalance ratio IB decreases (increases to the negative side), the revolution speed variation parameter Y increases. Here, IB2 in the figure is a value of the imbalance ratio IB corresponding to the abnormality determination value and is, for example, −30%.

Prescribed guard ranges are provided for the control amounts in the main A/F ratio control and auxiliary A/F ratio control (referred to hereinbelow as a main A/F ratio control amount and an auxiliary A/F ratio control amount) in order to prevent the respective values from being excessive.

However, the research results obtained by the inventor have demonstrated that there is a correlation between the auxiliary A/F ratio control amount and the revolution speed variation, and that where the absolute value of the auxiliary A/F ratio control amount increases to the vicinity of the guard value of the prescribed guard range, erroneous determination may be performed in imbalance abnormality determination.

Figure 11:
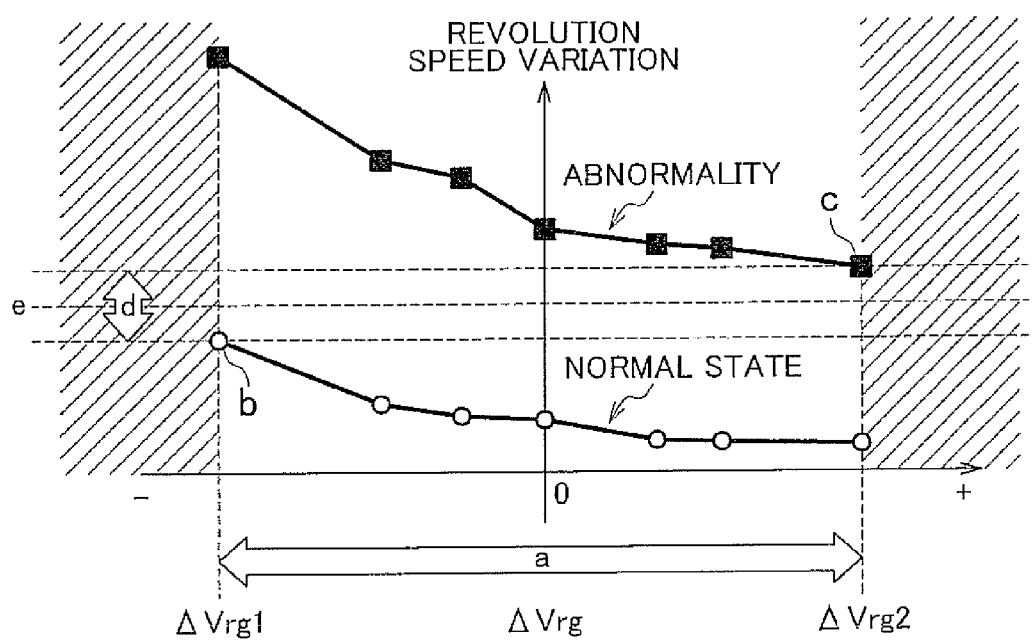
FIG. 11 is a graph illustrating the relationship between a post-catalyst sensor learning value and the revolution speed variation, the graph showing a prescribed guard range.

This issue will be explained with reference to FIG. 11. In FIG. 11, the abscissa indicates the post-catalyst sensor learning value ΔVrg serving as the auxiliary A/F ratio control amount, and the ordinate indicates the revolution speed variation.

When the post-catalyst sensor learning value ΔVrg is zero in the auxiliary A/F ratio control, no fuel injection amount correction is performed based on the post-catalyst sensor learning value ΔVrg. As the post-catalyst sensor learning value ΔVrg increases to the positive side from zero, the fuel injection amount is corrected to increase (so that the A/F ratio decreases), and as the post-catalyst sensor learning value ΔVrg increases to the negative side from zero, the fuel injection amount is corrected to decrease (so that the A/F ratio increases).

The revolution speed variation indicated by the ordinate is equivalent to the value of the revolution speed variation parameter Y In FIG. 11, a point located at a higher position indicates a larger revolution speed variation.

The prescribed guard range for the post-catalyst sensor learning value ΔVrg is shown by an arrow "a" in the figure and is a range in which the post-catalyst sensor learning value ΔVrg is equal to or larger than a lower limit guard value ΔVrg1 on the negative side, and is equal to or smaller than an upper limit guard value ΔVrg2 on the positive side. Note that ΔVrg1<0<ΔVrg2.

White circles plotted in the figure represent data relating to a normal state in which no lean-deviation abnormality has occurred. Black tetragonals plotted in the figure represent data relating to an abnormal state in which a lean-deviation abnormality has occurred in one cylinder.

As shown in the figure, in the normal state as well as in the abnormal state, where the post-catalyst sensor learning value ΔVrg changes, the revolution speed variation also changes, and as the post-catalyst sensor learning value ΔVrg increases from the negative side to the positive side, the revolution speed variation tends to decrease.

In a cylinder with an A/F ratio that has deviated to the rich side with respect to the stoichiometric A/F ratio, the combustion state is stable and sufficient torque is output. Therefore, the revolution speed variation in the cylinder is small. In a cylinder with an A/F ratio that has deviated to the lean side with respect to the stoichiometric A/F ratio, the combustion state is unstable and sufficient torque is not output. Therefore, the revolution speed variation in the cylinder is large. Where the post-catalyst sensor learning value ΔVrg changes, the entire system deviates to the rich side or lean side. Therefore, the combustion state changes and the revolution speed variation changes even if the conditions are the same.

Data "b" that demonstrates the largest revolution speed variation in the normal state is obtained when the post-catalyst sensor learning value ΔVrg is equal to the lower limit guard value ΔVrg1. Data "c" that demonstrates the smallest revolution speed variation in the abnormal state is obtained when the post-catalyst sensor learning value ΔVrg is equal to the upper limit guard value ΔVrg2.

The value of the post-catalyst sensor learning value ΔVrg may vary within the aforementioned prescribed guard range "a" depending on variations among individual engines and vehicles, degradation degree of the pre-catalyst sensor 17, and operating state (a stationary operating state, a transient operating state, etc.) of the engine. Accordingly, the revolution speed variation may also vary according to this variation in the post-catalyst sensor learning value.

Meanwhile, when imbalance abnormality determination is performed, whether or not an abnormality has occurred is uniformly determined on the basis of the revolution speed variation parameter Y, without taking into account the variation in the revolution speed variation corresponding to the post-catalyst sensor learning value ΔVrg.

Therefore, in order to determine whether or not an abnormality has occurred so that the influence of the variation in revolution speed variation corresponding to the post-catalyst sensor learning value ΔVrg is minimized, it is necessary to set the abnormality determination value to a value corresponding to the revolution speed variation within a range "d" between data "b" and "c", preferably to an intermediate value "e" in this range "d".

However, since the range "d" is comparatively narrow, even when the abnormality determination value is set to the intermediate value "e" within the range "d", erroneous detection or erroneous determination may be performed. For example, where the value of revolution speed variation represented by data "b" deviates, for some reason, from the position shown in the figure to a large value and exceeds the intermediate value "e", an abnormality is erroneously determined (that is, an erroneous abnormality determination is made), even though a normal state should be determined. Further, where the value of revolution speed variation represented by data "c" deviates, for some reason, to a small value and falls below the intermediate value "e", a normal state is erroneously determined (that is, an erroneous normal state determination is made), even though an abnormality should be determined.

Figure 12:
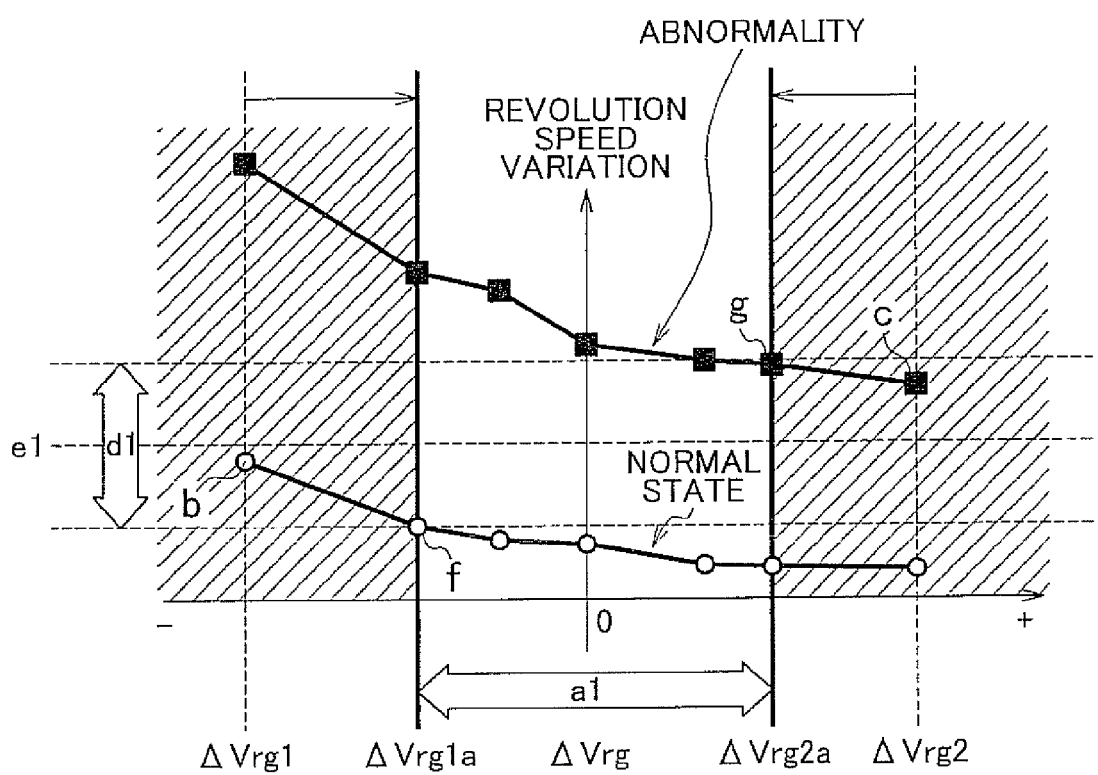
FIG. 12 is a graph illustrating the relationship between the post-catalyst sensor learning value and the revolution speed variation; the graph showing a reduced guard range.

Accordingly, in the embodiment, as shown in FIG. 12, the guard range of the post-catalyst sensor learning value ΔVrg is reduced during abnormality determination. Thus, the guard range during abnormality determination is represented by an arrow "a1" in the figure, and this range "a1" is narrower than the prescribed guard range "a". Further, the lower limit guard value on the negative side is increased from the prescribed ΔVrg1 to ΔVrg1a, and the upper limit guard value on the positive side is decreased from the prescribed ΔVrg2 to ΔVrg2a. Thus, the following conditions are satisfied: ΔVrg1<ΔVrg1a<0<ΔVrg2a<ΔVrg2. The changed lower limit guard value and the changed upper limit guard value will be referred to hereinbelow as a restricted lower limit guard value and a restricted upper limit guard value, respectively.

Accordingly, data demonstrating the largest revolution speed variation in the normal state is data "f" obtained when the post-catalyst sensor learning value ΔVrg is equal to the restricted lower limit guard value ΔVrg1a. Data demonstrating the smallest revolution speed variation in the abnormal state is data "g" obtained when the post-catalyst sensor learning value ΔVrg is equal to the restricted upper limit guard value ΔVrg2a.

A range "d1" of the revolution speed variation between these data "f" and "g" is wider than the prescribed range "d" shown in FIG. 11. Therefore, by setting the abnormality determination value to a value within this range "d1", preferably to an intermediate value "e1" in this range "d1", it is possible to prevent erroneous detection, that is, erroneous abnormality determination. The range "d1" may be considered as "revolution speed variation range" in accordance with the invention.

Thus, the value of the revolution speed variation demonstrated by the data "f", which is the closest to the abnormality determination value "e1" in the normal state, is a small value that is farther from the abnormality determination value "e1" than the value of the revolution speed variation demonstrated by the data "b" is. Further, the value of the revolution speed variation demonstrated by the data "g", which is the closest to the abnormality determination value "e1" in the abnormal state, is a large value that is farther from the abnormality determination value "e1" than the value of the revolution speed variation demonstrated by the data "c" is.

Therefore, both in the normal state and in the abnormal state, the determination results are unlikely to be affected by the variation in the revolution speed variation corresponding to the post-catalyst sensor learning value ΔVrg. As a result, erroneous detection or erroneous determination can be prevented. For example, even if the revolution speed variation demonstrated by the data "f" deviates, for some reason, from the position shown in the figure to a larger value, since the margin to the abnormality determination value "e1" is large, the revolution speed variation demonstrated by the data "f" is unlikely to exceed the abnormality determination value "e1", and the erroneous abnormality determination can be prevented. Further, even if the revolution speed variation demonstrated by data "g" deviates, for some reason, from the position shown in the figure to a smaller value, since the margin to the abnormality determination value "e1" is large, the revolution speed variation demonstrated by the data "g" is unlikely to fall below the abnormality determination value "e1", and the erroneous normal state determination can be prevented.

Thus, according to the embodiment, erroneous determination during imbalance abnormality determination can be prevented and the determination accuracy can be increased.

Following the above-described considerations, the abnormality determination value of the embodiment is set to the intermediate value "e1" in the range "d1".

Figure 13:
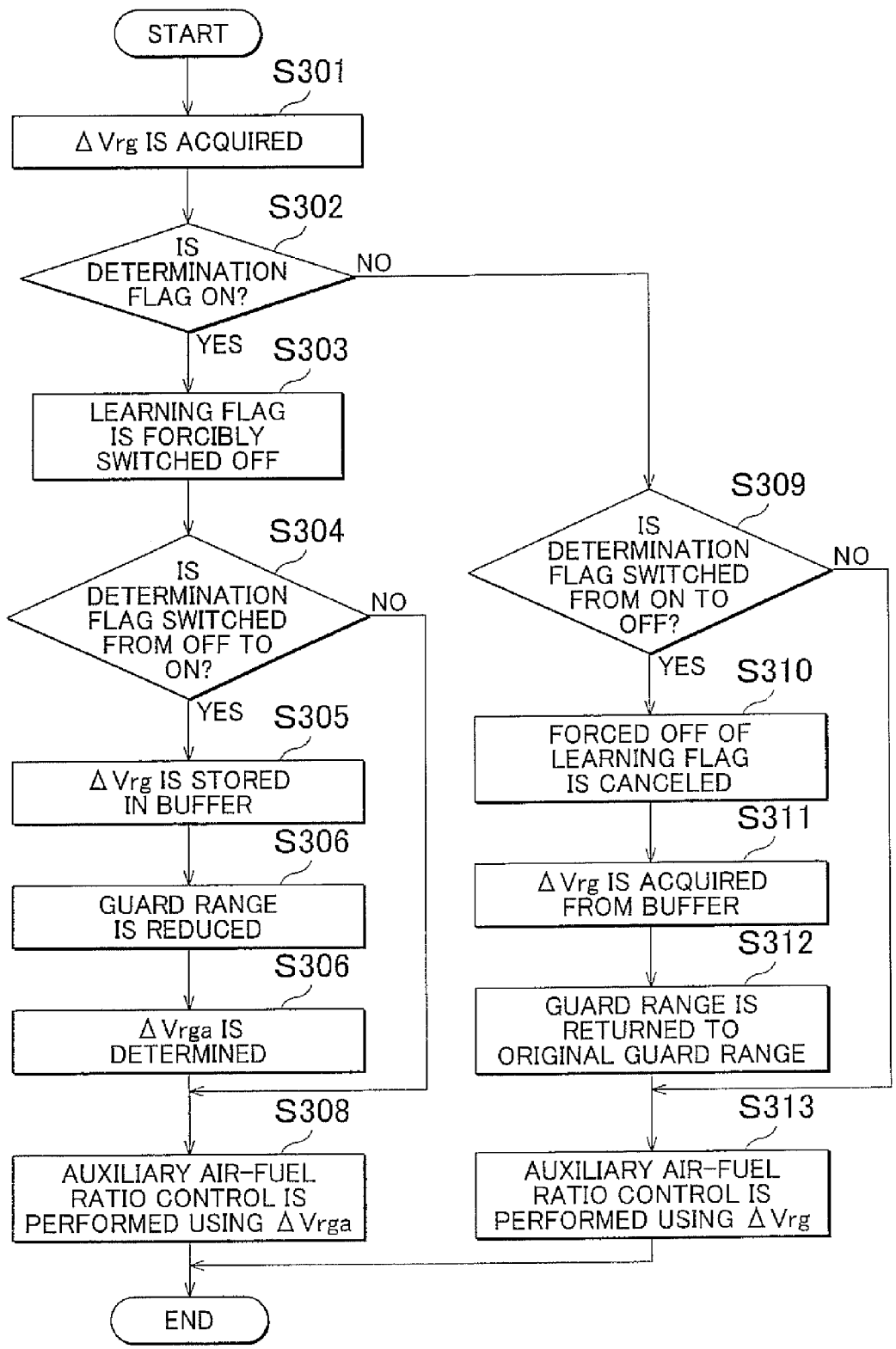
FIG. 13 is a flowchart relating to a routine of the auxiliary A/F ratio control in the case where imbalance abnormality determination is performed.
Figure 14:
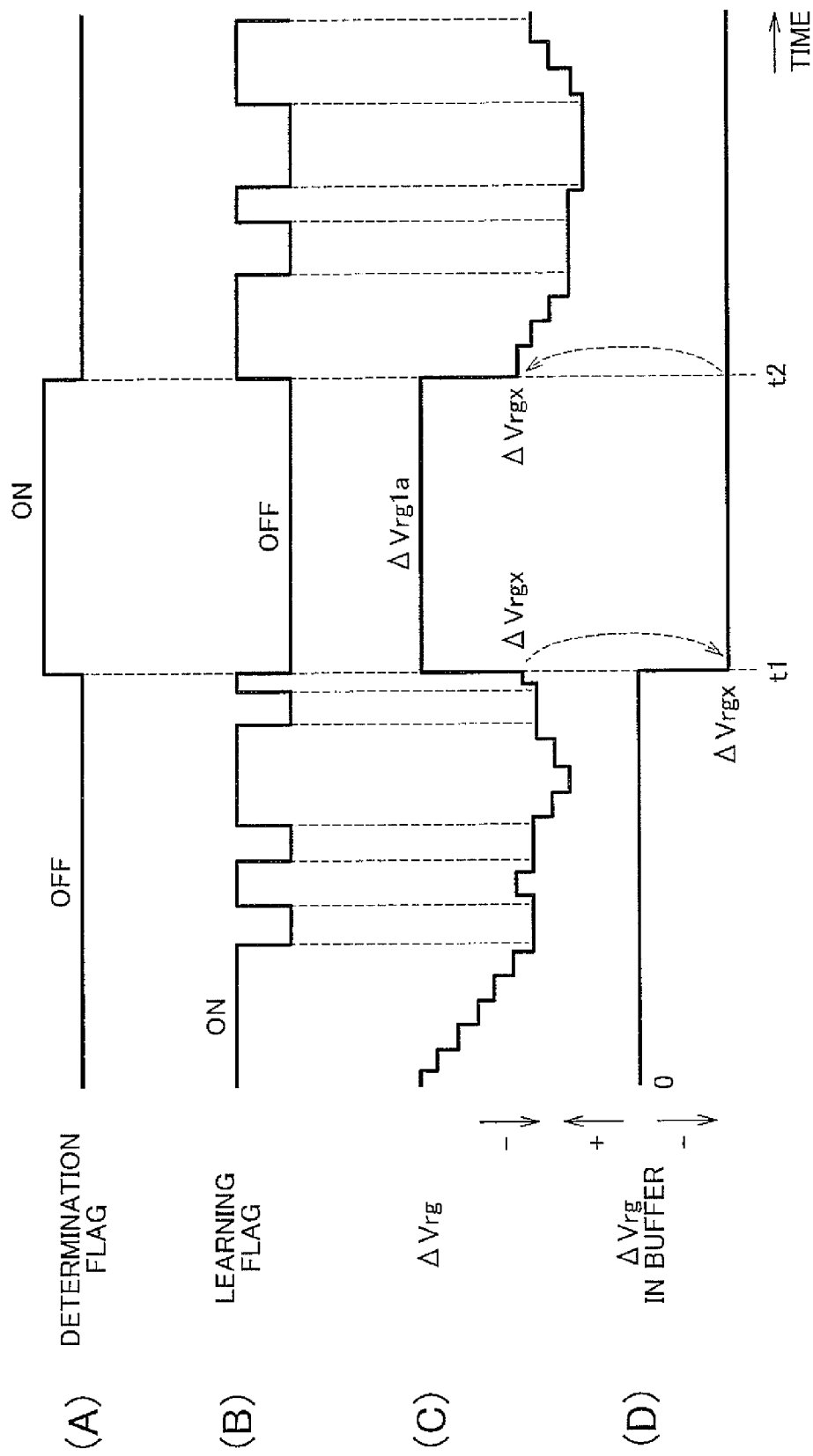
FIG. 14 is a time chart illustrating changes in values occurring when the routine shown in FIG. 13 is implemented.

A method of the auxiliary A/F ratio control in the case where the imbalance abnormality determination is performed will be described below in greater detail with reference to FIGS. 13 and 14. FIG. 13 is a flowchart relating to the routine of the auxiliary A/F ratio control, and FIG. 14 shows changes in each value taking place when the routine is implemented.

The routine shown in FIG. 13 can be implemented by the ECU 20 repeatedly at intervals of a predetermined calculation period. In FIG. 14, a portion (A) shows an ON/OFF state of a determination flag, a portion (B) shows an ON/OFF state of a learning flag, a portion (C) shows the values of the post-catalyst sensor learning value $\Delta Vrg$, and a portion (D) shows the values of the post-catalyst sensor learning value $\Delta Vrg$ stored in a buffer. These portions will be explained below.

Referring to FIG. 13, in step S301, a value of the post-catalyst sensor learning value $\Delta Vrg$ at the present computational timing is acquired.

Then, in step S302, it is determined whether or not the determination flag is ON. The determination flag is ON when the imbalance abnormality determination is performed and OFF when the imbalance abnormality determination is not performed. The determination flag is switched from OFF to ON when a predetermined implementation condition is fulfilled and switched from ON to OFF when the determination ends.

When the determination flag is ON, the imbalance abnormality determination is started or implemented, the processing advances to step S303, and the learning flag is forcibly switched OFF. The learning flag serves to allow the learning of the post-catalyst sensor learning value $\Delta Vrg$ (and the auxiliary A/F ratio correction amount Kr), which is the learning value relating to the auxiliary A/F ratio control. When the learning flag is ON, the learning is allowed, and when the learning flag is OFF, the learning is prohibited. For this reason, the post-catalyst sensor learning value $\Delta Vrg$ is updated only when the learning flag is ON, and when the learning flag is OFF, the updating is stopped and the learning value obtained immediately before the learning flag is switched OFF is maintained (see the portion (B) and the portion (C) in FIG. 14).

The learning flag is basically switched ON/OFF by a separate routine which is not shown in the figure. Thus, the learning flag is switched ON when a predetermined condition is fulfilled, and switched OFF when the predetermined condition is not fulfilled. In step S303, the learning flag is forcibly switched OFF regardless of whether or not the predetermined condition is fulfilled.

Since the learning flag is switched OFF in step S303, learning and updating of the post-catalyst sensor learning value $\Delta Vrg$ is stopped in the imbalance abnormality determination.

Then, in step S304, it is determined whether or not the determination flag is switched from OFF to ON at the present timing. In other words, it is determined whether or not the present timing is the timing at which the imbalance abnormality determination starts. When the determination result is YES, in step S305, the value of the post-catalyst sensor learning value $\Delta Vrg$ immediately before the start of the imbalance abnormality determination, that is, the value of the post-catalyst sensor learning value $\Delta Vrg$ that has been acquired at the previous timing is stored in the dedicated buffer. This process is shown in the portion (C) and the portion (D) in FIG. 14. In FIG. 14, timing t1 is the present timing, that is, the timing at which the imbalance abnormality determination starts, and at this time, the value $\Delta Vrgx$ of the post-catalyst sensor learning value immediately before the start of the imbalance abnormality determination is stored in the dedicated buffer, as shown in the portion (D). The value of the post-catalyst sensor learning value in the buffer that has thus been stored is called "$\Delta Vrg$ in the buffer". The initial value of the $\Delta Vrg$ in the buffer is zero.

Then, in step S306, the guard range of the post-catalyst sensor learning value $\Delta Vrg$ is reduced from the prescribed guard range as shown in FIG. 12. Thus, the guard range of the post-catalyst sensor learning value $\Delta Vrg$ is reduced at the same time as the start of the imbalance abnormality determination.

Then, in step S307, the value $\Delta Vrga$ of the post-catalyst sensor learning value that is used in the auxiliary A/F ratio control after the reduction, that is, during the imbalance abnormality determination, is determined. The determination method is described below.

When the post-catalyst sensor learning value $\Delta Vrg$ immediately before the start of the imbalance abnormality determination (i.e., the post-catalyst sensor learning value $\Delta Vrg$ at the previous timing) is within the reduced guard range, this value is directly determined as the value $\Delta Vrga$ of the post-catalyst sensor learning value during the imbalance abnormality determination.

Meanwhile, when the post-catalyst sensor learning value $\Delta Vrg$ immediately before the start of the imbalance abnormality determination is outside the reduced guard range, the restricted lower limit guard value $\Delta Vrg1a$ or the restricted upper limit guard value $\Delta Vrg2a$ that is the closest to the post-catalyst sensor learning value $\Delta Vrg$ immediately before the start of the determination is determined as the value $\Delta Vrga$ of the post-catalyst sensor learning value during the imbalance abnormality determination.

Referring to FIG. 12, for example, when the post-catalyst sensor learning value $\Delta Vrg$ immediately before the start of the imbalance abnormality determination is $\Delta Vrg1$ demonstrated by the data "b", the restricted lower limit guard value $\Delta Vrg1a$ that is the closest thereto is used as the value $\Delta Vrga$ of the post-catalyst sensor learning value during the imbalance abnormality determination. Further, for example, when the post-catalyst sensor learning value $\Delta Vrg$ immediately before the start of the imbalance abnormality determination is $\Delta Vrg2$, the restricted upper limit guard value $\Delta Vrg2a$ that is the closest thereto is used as the value $\Delta Vrga$ of the post-catalyst sensor learning value during the imbalance abnormality determination.

The portion (C) in FIG. 14 shows the former example. That is, since the post-catalyst sensor learning value $\Delta Vrgx$ immediately before the start of the imbalance abnormality determination is less than the restricted lower limit guard value $\Delta Vrg1a$, the post-catalyst sensor learning value $\Delta Vrgx$ is changed to the restricted lower limit guard value $\Delta Vrg1a$, which is larger than the post-catalyst sensor learning value $\Delta Vrgx$, at the same time as the start of the imbalance abnormality determination.

Thus, when the post-catalyst sensor learning value immediately before the start of the determination is outside the reduced guard range, the auxiliary A/F ratio control is performed during the determination by using the guard value that is the closest to this learning value. Therefore, the accuracy of the auxiliary A/F ratio control can be maintained during the determination.

Returning to FIG. 13, in the subsequent step S308, the auxiliary A/F ratio control is performed by using the value AVrga of the post-catalyst sensor learning value determined in step S307. This determined value AVrga is used at all times during the imbalance abnormality determination. Thus, the routine ends.

Meanwhile, when the determination result of step S304 is NO, steps S305, S306, and S307 are skipped and the processing advances to step S308.

In the above-described steps S302 to S308, the learning flag is set OFF (step S303) and the update of the post-catalyst sensor learning value $\Delta Vrg$ is stopped at the same time as the start of the determination (step S302: YES). Further, at the start time (step S304: YES), the post-catalyst sensor learning value $\Delta Vrg$ immediately before the start time is stored in the buffer (step S305), the guard range is reduced (step S306), the new value $\Delta Vrga$ of the post-catalyst sensor learning value is determined (step S307), and the auxiliary A/F ratio control is implemented on the basis of this $\Delta Vrga$ (step S308). After the determination has been started, the value $\Delta Vrga$ of the post-catalyst sensor learning value determined at the start time is maintained and the auxiliary A/F ratio control is implemented on the basis of the value $\Delta Vrga$ (step S308).

When the determination flag is OFF in step S302, the imbalance abnormality determination is ended and the processing advances to step S309.

In step S309, it is determined whether or not the present timing is the timing at which the determination flag has been switched from ON to OFF, in other words, whether or not the present timing is the timing at which the imbalance abnormality determination has ended. When the determination result is YES, the learning flag that has been forcibly set OFF is switched to ON in step S310. As a result, the post-catalyst sensor learning value that could not be updated and learned now can be updated and learned.

Further, in step S311, the value of the post-catalyst sensor learning value immediately before the start of the determination, which has been stored in the dedicated buffer, is acquired from the dedicated buffer. The acquisition operation is shown in the portion (C) and the portion (D) in FIG. 14. In FIG. 14, time t2 is the present timing, that is, the timing at which the imbalance abnormality determination ends, and at this time, the value $\Delta Vrgx$ of the post-catalyst sensor learning value, which has been stored in the buffer, is taken out of the buffer and used as the post-catalyst sensor learning value $\Delta Vrg$.

Then, in step S312, the guard range is returned to the original prescribed guard range. As a result, the guard range is expanded as shown in FIG. 11.

Further, in step S313, the auxiliary A/F ratio control is implemented by using the usual value $\Delta Vrg$ of the post-catalyst sensor learning value. The routine thus ends.

Meanwhile, when the determination result of step S309 is NO, steps S310, S311, S312 are skipped, and the processing advances to step S313.

In the above-described steps S309 to S313, the learning flag that has been forcibly set OFF is set ON (step S310) and the update and learning of the post-catalyst sensor learning value $\Delta Vrg$ corresponding to the ON-OFF state of the learning flag is restarted at the same time as the end of the determination (step S309: YES). Then, the value of the post-catalyst sensor learning value immediately before the start of the determination is taken out of the buffer (step S311), the guard range is returned to the original prescribed guard range, that is, the guard range is expanded (step S312), and the auxiliary A/F ratio control is implemented on the basis of the post-catalyst sensor learning value that has been taken out (step S313). As shown in the portion (C) in FIG. 14, as a result of returning the guard range to the original prescribed guard range, it is possible to use the value $\Delta Vrgx$ of the post-catalyst sensor learning value, which is less than the restricted lower limit guard value $\Delta Vrg1a$.

Then, the auxiliary A/F ratio control is implemented on the basis of the value $\Delta Vrg$ of the post-catalyst sensor learning value, which has been acquired in step S301, as in the usual procedure (step S313).

Thus, when the determination is started, the post-catalyst sensor learning value immediately before the start of the determination is temporarily stored, and when the determination ends, this value is taken out and the auxiliary A/F ratio control after the end of the determination is started. Therefore, the accuracy of the auxiliary A/F ratio control can be maintained after the end of the determination.

With this routine, the learning of the post-catalyst sensor learning value is forcibly prohibited during the imbalance abnormality determination (step S303). During the imbalance abnormality determination, the auxiliary A/F ratio control is sometimes performed on the basis of the other learning value ($\Delta Vrga$) different from the learning value that has been learned. Therefore, by prohibiting the learning during the imbalance abnormality determination, it is possible to prevent inadequate learning based on the other learning value.

Although the embodiment of the invention is described in detail hereinabove, the invention may be realized in other embodiments. For example, in the abovementioned embodiment, the post-catalyst sensor learning value $\Delta Vrg$ is used as the auxiliary A/F ratio control amount, but the auxiliary A/F ratio correction amount Kr equivalent thereto may be also used. In this case, there is a guard range of the auxiliary A/F ratio correction amount Kr corresponding to the guard range of the post-catalyst sensor learning value $\Delta Vrg$. Therefore, the guard range of the auxiliary A/F ratio control amount indicates the guard range of the auxiliary A/F ratio correction amount Kr. The invention may be also applied to a rich-deviation abnormality. This is because the revolution speed variation of the engine can also increase when a rich-deviation abnormality occurs.

Thus, the embodiments of the invention that have been disclosed in the specification are to be considered in all respects as illustrative and not restrictive. The technical scope of the invention is defined by claims, and all changes which come within the meaning and range of equivalency of the claims are therefore intended to be embraced therein.

What is claimed is:

1. An inter-cylinder air-fuel ratio imbalance abnormality detection device, comprising:
   a catalyst that is provided in an exhaust passage of a multi-cylinder internal combustion engine;
   a pre-catalyst sensor that is an air-fuel ratio sensor provided upstream of the catalyst;
   a post-catalyst sensor that is an air-fuel ratio sensor provided downstream of the catalyst;

an air-fuel ratio control unit that performs main air-fuel ratio control based on an output of the pre-catalyst sensor and auxiliary air-fuel ratio control based on an output of the post-catalyst sensor;

a control amount calculation unit that calculates a control amount for the auxiliary air-fuel ratio control based on the output of the post-catalyst sensor;

a revolution variation detection unit that detects a revolution variation of the internal combustion engine;

an abnormality detection unit that detects an inter-cylinder air-fuel ratio imbalance abnormality on the basis of a detected value of the revolution variation; and a guard range reduction unit that reduces a guard range of the control amount during detection of the imbalance abnormality.

2. The inter-cylinder air-fuel ratio imbalance abnormality detection device according to claim 1, wherein the abnormality detection unit detects, on the basis of the detected value of the revolution variation, a lean-deviation abnormality in which an air-fuel ratio of a part of cylinders has deviated to a lean side with respect to air-fuel ratios of others of the cylinders, and the guard range reduction unit reduces the guard range of the control amount during detection of the lean-deviation abnormality.

3. The inter-cylinder air-fuel ratio imbalance abnormality detection device according to claim 1, wherein the guard range reduction unit reduces the guard range of the control amount at a same time as a start of imbalance abnormality detection; and when the control amount immediately before the start of the imbalance abnormality detection is outside the reduced guard range, the air-fuel ratio control unit performs the auxiliary air-fuel ratio control during the imbalance abnormality detection by using a guard value that is the closest to the control amount immediately before the start of the detection, and that defines the reduced guard range, as the control amount.

4. The inter-cylinder air-fuel ratio imbalance abnormality detection device according to claim 3, wherein the guard range reduction unit returns the guard range of the control amount to an original prescribed guard range at a same time as an end of the imbalance abnormality detection; and the air-fuel ratio control unit starts the auxiliary air-fuel ratio control after the end of the imbalance abnormality detection by using the control amount immediately before the start of the imbalance abnormality detection, as the control amount.

5. The inter-cylinder air-fuel ratio imbalance abnormality detection device according to claim 1, wherein the abnormality detection unit determines that there is the imbalance abnormality when the detected value of the revolution variation is equal to or greater than a predetermined abnormality determination value.

6. The inter-cylinder air-fuel ratio imbalance abnormality detection device according to claim 1, wherein the revolution variation detection unit detects the revolution variation for each cylinder of the internal combustion engine.

* * * * *